(12) United States Patent
Gray et al.

(10) Patent No.: US 8,147,201 B2
(45) Date of Patent: Apr. 3, 2012

(54) KINETIC HYDRO POWER TRIANGULAR BLADE HUB

(75) Inventors: John Gray, Charlottesville, VA (US); Dean Corren, Burlington, VT (US)

(73) Assignee: Verdant Power Inc., Arlington, VA (US)

( * ) Notice: Subject to any disclaimer, the term of this patent is extended or adjusted under 35 U.S.C. 154(b) by 1271 days.

(21) Appl. No.: 11/889,251

(22) Filed: Aug. 10, 2007

(65) Prior Publication Data

US 2009/0041584 A1    Feb. 12, 2009

(51) Int. Cl.
*F01D 5/02*    (2006.01)
(52) U.S. Cl. .............. 416/204 A; 416/204 R; 416/244 A
(58) Field of Classification Search .............. 416/204 R, 416/204 A, 231 R, 213 A, 244 R, 245 R, 416/245 A, 244 A, 244 B, 248
See application file for complete search history.

(56) References Cited

U.S. PATENT DOCUMENTS

| | | | | |
|---|---|---|---|---|
| 1,864,260 A | * | 6/1932 | Squires | 416/225 |
| 4,026,587 A | * | 5/1977 | Hultman et al. | 290/53 |
| 4,655,687 A | * | 4/1987 | Atkinson | 416/193 A |
| 6,309,181 B1 | * | 10/2001 | Etschel | 416/134 R |
| 7,878,763 B2 | * | 2/2011 | Keith et al. | 416/193 A |

* cited by examiner

*Primary Examiner* — Edward Look
*Assistant Examiner* — Ryan Ellis
(74) *Attorney, Agent, or Firm* — Davidson, Berquist, Jackson & Gowdey, LLP (57) ABSTRACT

A rotor hub mounting arrangement for removably mounting a plurality of turbine rotor blades to the rotor hub in a compact and secure manner. The rotor hub includes an internal mounting assembly, preferably comprised of a series of interconnected mounting plates, positioned adjacent a series of foil shaped openings in the rotor hub into which the root end of turbine blades can be inserted and removably mounted to the internal mounting assembly.

16 Claims, 10 Drawing Sheets

KINETIC HYDRO POWER TRIANGULAR BLADE HUB

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

CROSS-REFERENCE TO CO-PENDING APPLICATIONS

The present invention is related to the following co-pending U.S. Patent applications: (1) U.S. Pat. No. 4,613,279, Corren et al. entitled "Kinetic Hydro Energy Conversion System," which issued on Sep. 23, 1986; (2) United States Published Patent Application No. 2004/0070210, Johansen et al., entitled "Apparatus For Production Of Energy From Currents In Bodies Of Water, a Foundation and A Method For The Installation Of The Apparatus," published on Apr. 15, 2004; (3) U.S. patent application Ser. No. 11/514,900, filed on Sep. 5, 2006, entitled "Rotating Wedge Leveler"; (4) U.S. patent application Ser. No. 11/727,112, filed on Mar. 23, 2007, entitled "Cable Jacket Sealing, Pressurization, And Monitoring"; (5) U.S. patent application Ser. No. 11/429,268, filed on May 8, 2006, entitled "Single Sided Power Generating Support Frame"; (6) U.S. patent application Ser. No. 11/634,847, filed on Dec. 7, 2006, entitled "Blade Tip . . ."; (7) U.S. patent application Ser. No. 11/400,281, filed on Apr. 10, 2006, entitled "Kinetic Hydropower From Slow Moving Waters"; and (8) U.S. patent application Ser. No. 11/979,999, filed on Nov. 13, 2007, entitled "Improved Yaw Control".

FIELD OF THE DISCLOSURE

This relates to Kinetic Hydro Power (KHP) system turbines. In particular, this relates to improved axial-flow turbines and specifically to a mounting arrangement and technique that permits KHP turbine blades to be positively and securely mounted to a rotor hub, and also permits rotor blades to be easily changed or replaced. The structure of the turbine and the mounting hub technique permits newly designed rotor blades having specifically designed root end structures to be mounted to corresponding mounts provided within a unique rotor hub structure. The result is a strong, simple and yet effective rotor hub design that permits blade roots to be housed and connected while providing a smooth and streamlined rotor hub and rotor blade connection using an efficient mounting assembly allowing rotor blade replacement.

INTRODUCTION

Glossary: As used throughout this document:

The term "rotor" refers to the entire rotating structure that is attached to the turbine.

The phrase "rotor hub" shall mean any device, arrangement or assembly that will accept the root end of a rotor blade and provide a secure connection therefor so that the entire structure can then be connected to a drive shaft.

The term "mounting plate" refers to and includes any arrangement located within the rotor hub to which a root of a rotor blade is attached.

The term "root" in connection with rotor blades refers to and includes the end part of a rotor blade structure, understanding that rotor blades can be formed through various techniques including rotor blades formed about an inner frame or skeleton, cast rotors and molded rotor structures; the root portion of a rotor blade is located at the interior or root end of the rotor blade and is the area of a rotor blade where the mechanism through which a rotor blade is attached to a rotor hub is located.

DESCRIPTION OF PRESENTLY PREFERRED EXAMPLES AND EMBODIMENTS OF THE INVENTION

Brief Description of Figures

The invention is better understood by reading the following detailed description with reference to the accompanying drawings in which:

FIG. 2b is a perspective view of an opposite side of the rotor hub in FIG. 2a;

DETAILED DESCRIPTION

A typical KHP turbine system is described in U.S. Pat. No. 4,613,279, the entire contents of which are incorporated herein by reference. Typical KHP turbine systems employ one or more turbines anchored to a base positioned within flowing water, for example a river bottom, each of which include an external rotor that rotates in response to water flowing there past via a sealed rotating shaft coupled to the nacelle or the body of the turbine. The nacelle, desirably, is a watertight enclosure that supports that rotor and which can house machinery comprising various electrical and mechanical components. Rotation of the rotor relative to the nacelle causes the electrical and mechanical components to generate power and suitable cable connections are provided so that electrical control or data signals can be sent between the turbine and a ground station, and so that generated power can be transmitted from the turbine onto a power grid.

Figure 1:
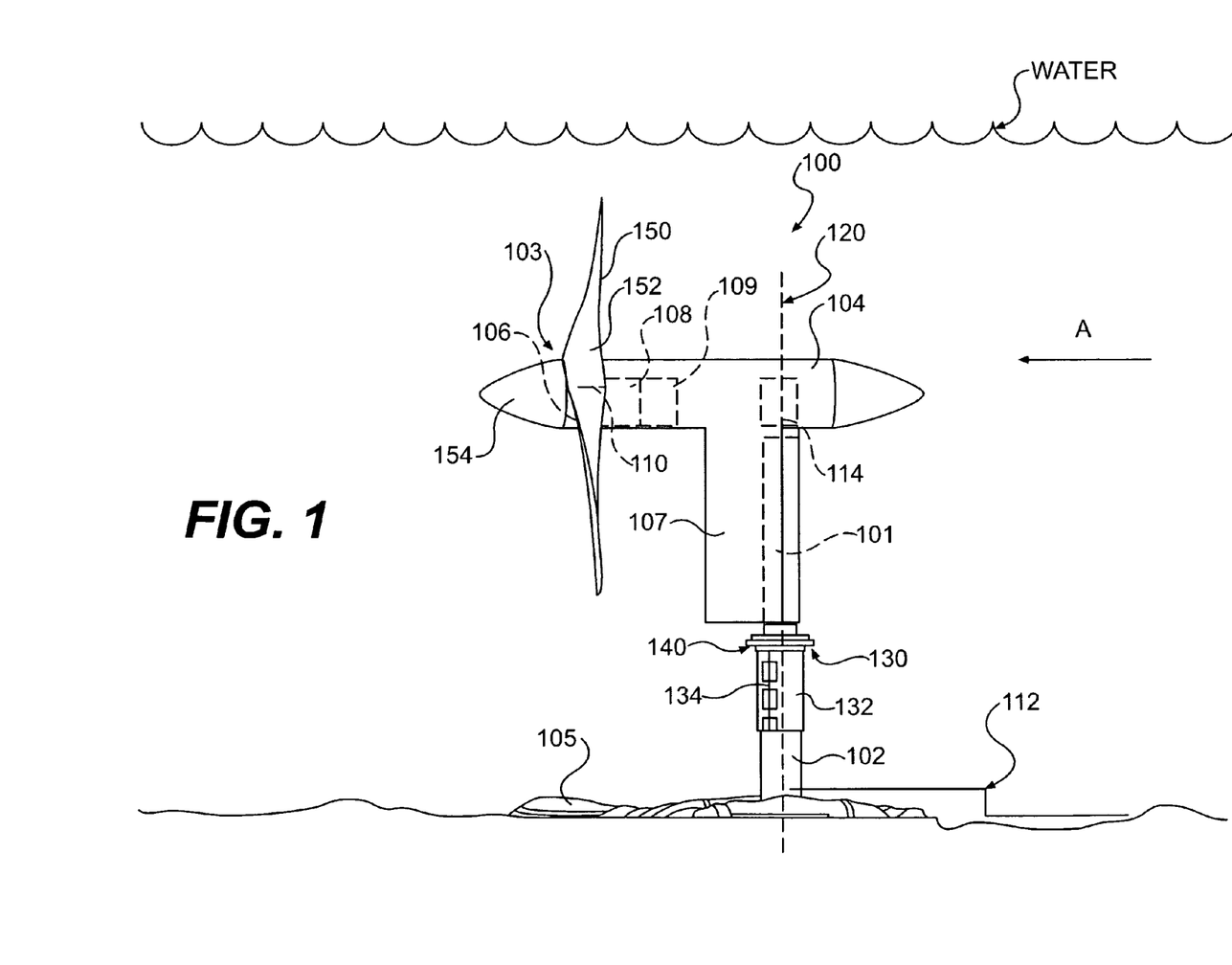
FIG. 1 is a front elevational view of an exemplary under water turbine.

In order for any KHP turbine, for example as is shown at 100 in FIG. 1, to be most useful and to produce power most efficiently, it is important that the turbine's rotor, nacelle and the supporting pylon be properly oriented in the flowing water or fluid stream.

FIG. 1 shows an exemplary embodiment of a KHP system turbine 100 that is shown as being anchored, for example, to the bottom of a river 105 or within some other body of flowing water by a pile or monopile 102 or another suitable anchoring method. The turbine 100 comprises several main portions including a rotor 103, a nacelle 104 to which the rotor 103 is rotatably attached, and inner and outer pylons 101 and 107, respectively. The nacelle 104 is preferably attached to the outer pylon 107 and both rotate relative to the inner pylon 101 which is itself mounted to pile 102.

The nacelle 104 encloses suitable power generating components including, for example, a gear box 108 and a generator 109. Furthermore, the nacelle 104 may also include various electronic controls and monitoring components 114 such as for monitoring shaft speed, bearing, gearbox and generator temperatures, or other operating or performance parameters.

A shaft 110 of the rotor 103 is rotatably coupled to the nacelle 104 through a dynamic shaft seal 106 that allows the shaft 110 to pass through seal 106 in a watertight manner, and so that it can engage and operate the gears of the gearbox 108 which drives generator 109 in accordance with the rotation of the rotor 103 without allowing water to leak into nacelle 104. As generator 109 is driven via gearbox 108, generator 109 creates electrical power that is transmitted or feed onto a power grid, as is known in the art. Turbine 100 can be suitably coupled to an on shore control station (not shown) via power and control cables shown at 112.

Rotor 103 is that portion of the turbine that rotates relative to nacelle 104 and is comprised of a plurality of rotor blades 150, a rotor hub 152 and a tail cone 154.

Figure 2A:
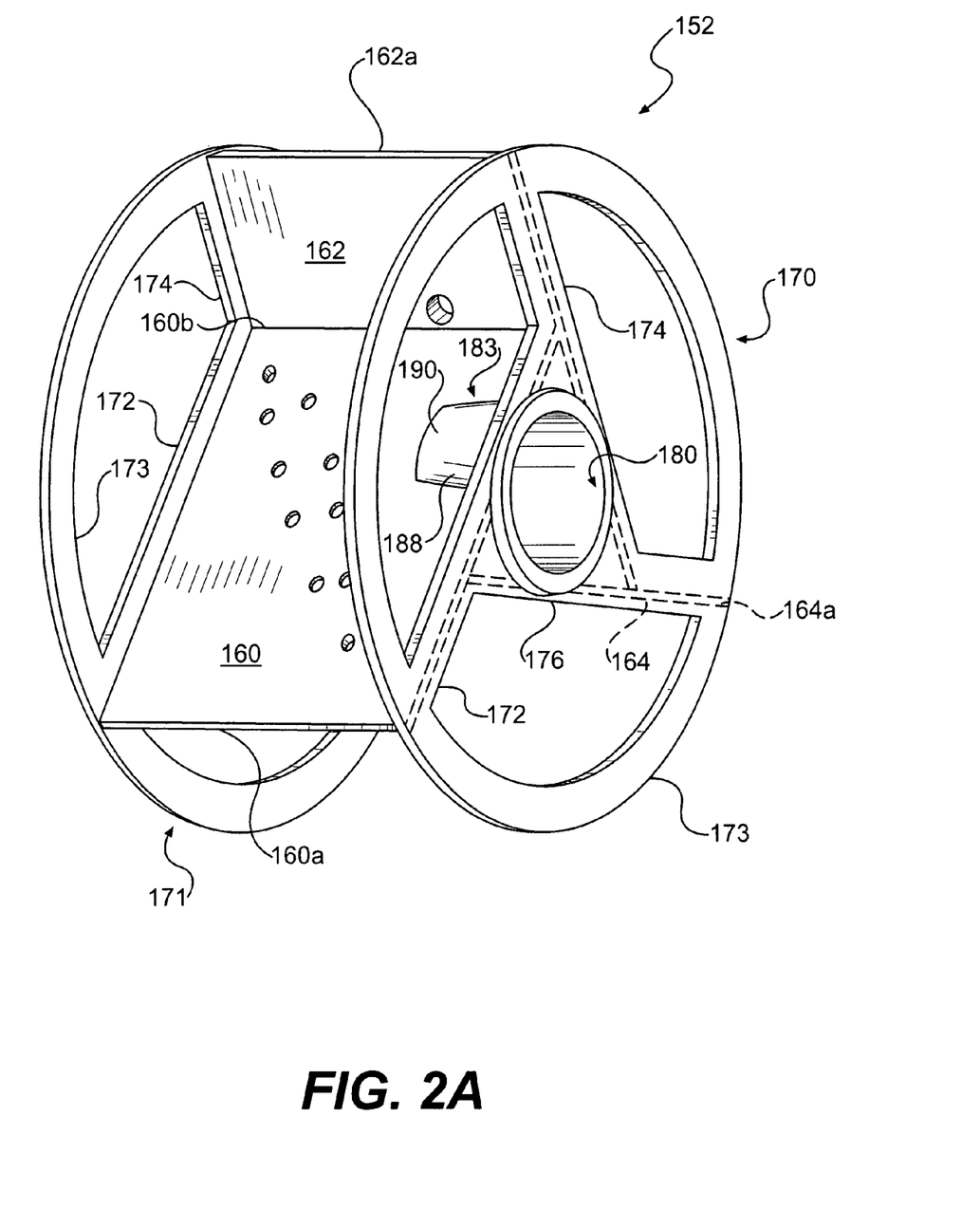
FIG. 2a is a perspective view of one side of a partially formed rotor hub.
Figure 2B:
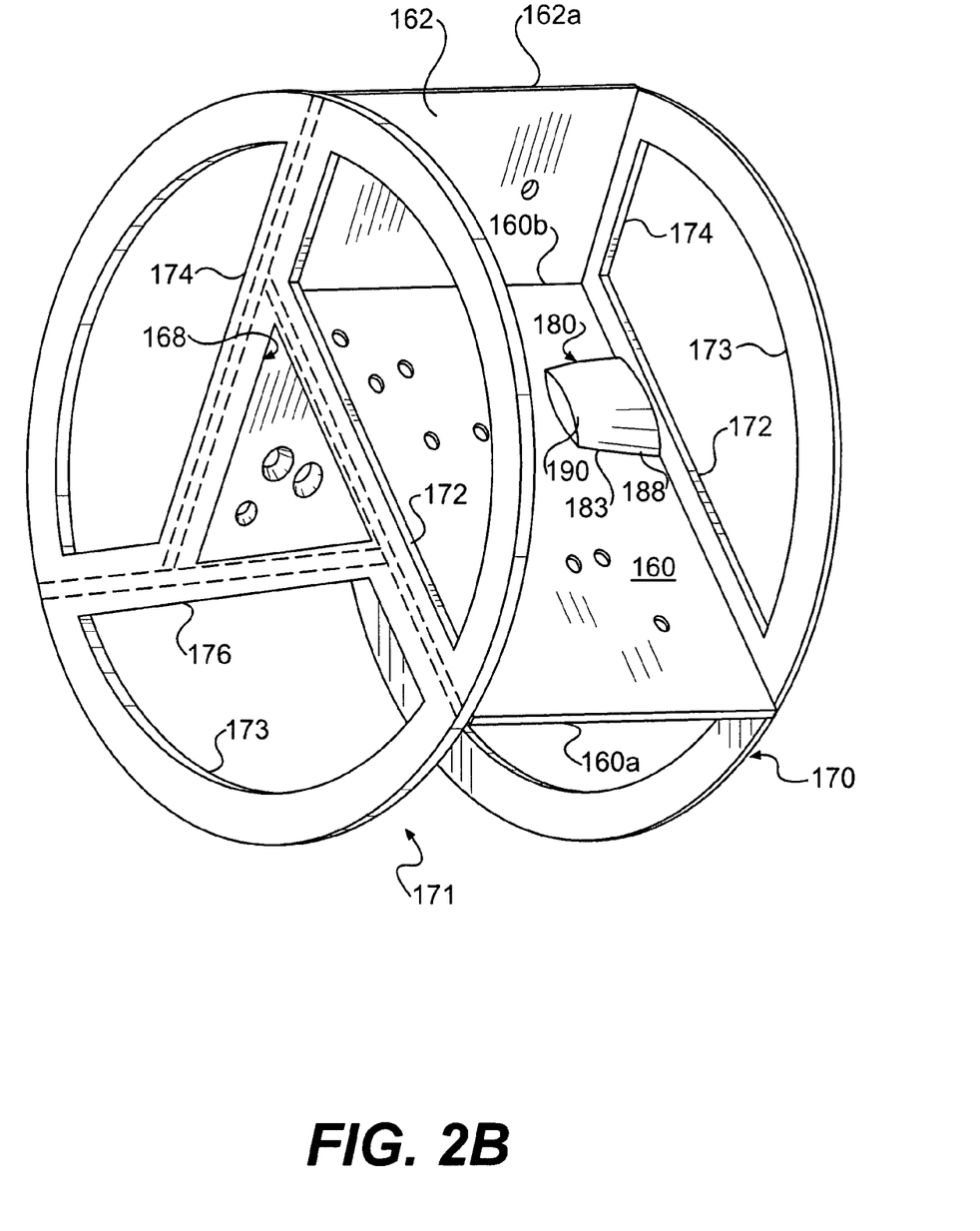
Figure 3A:
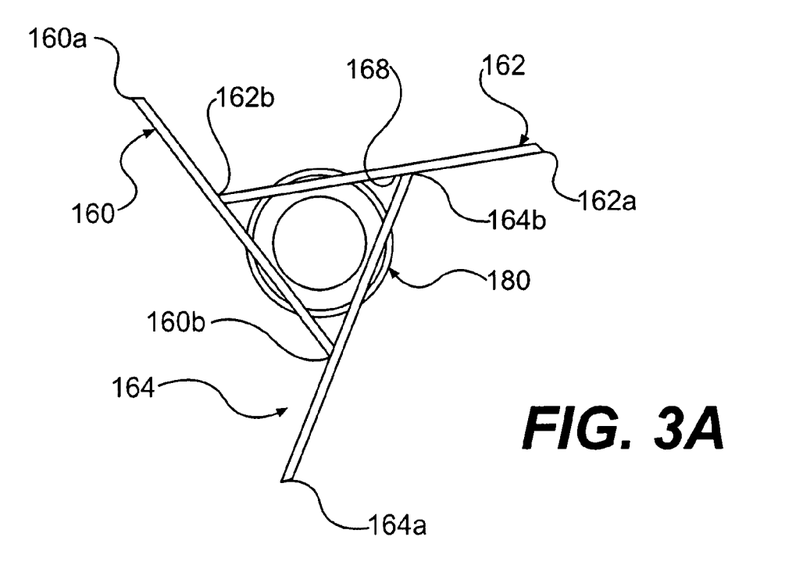
FIG. 3a is a side view of the core mounting plates in a rotor hub.

The rotor hub 152 is shown in FIGS. 2a, 2b, 3a, 3b and 4 and is preferably a cylindrical structure that includes an interior or core assembly comprised of three mounting plates 160, 162 and 164. The three mounting plates, 160, 162 and 164, respectively, extend in an end-to-end fashion and are oriented so that their outer ends, 160a, 162a and 164a, respectively, are located approximately 120° from each other and extend across substantially equal chords of the cylindrical rotor hub 152 as is depicted in the side view of FIG. 3a. As an example of the interconnection between plates 160-164, an interior end of each plate, for example an interior end 160b of plate 160 could touch one other plate, such as plate 162, at a point between about one quarter and about one third of the distance from the outer end. The interior ends 162b and 164b, respectively, of the other mounting plates 162 and 164 will likewise touch or engage one other plate in a similar manner. Each of those interior edges 160b-164b is preferably welded to the appropriate mating plates. In this way the three plates 160-164 will be interconnected as shown in FIG. 3a, and will form a triangular shaped interior recess or opening 168 at their center as shown in FIG. 2b as well. The open design as exhibited in FIGS. 2a-3a provides a great deal of easy access to the interior of this core structure of hub 152 and permits both the necessary assembly and welding steps to take place in an easy and efficient manner.

With plates 160-164 welded together, end plates 170 and 171, shown in FIGS. 2a and 2b, can then be mounted over and against each side of the formed mounting plate structure and welded in place. Each side plate 170 and 171, respectively, includes a circular outer rim 173 and three intersecting inner webs 172, 174 and 176 that are also spaced, in the exemplary embodiment being discussed, also about 120° apart so as to overlie the side edges of plates 160-164 as shown by the dotted lines in FIGS. 2a and 2b. Consequently, when the ends of plates 160-164 are welded to webs 172-176, respectively, the hub 152, will be a very rigid structure capable of supporting a plurality of rotor blades 150. It should be understood that the side of hub 152 shown in FIG. 2b is preferably the same as the side shown in FIG. 2a, each including side plates 170 and 171, respectively, each with its own cross webs that will form a central triangular opening 168 on each side. With both side plates 170 and 171 in place, the three mounting plates, 160-164, will each span across hub 152 and the distance between side plates 170 and 171.

Figure 3B:
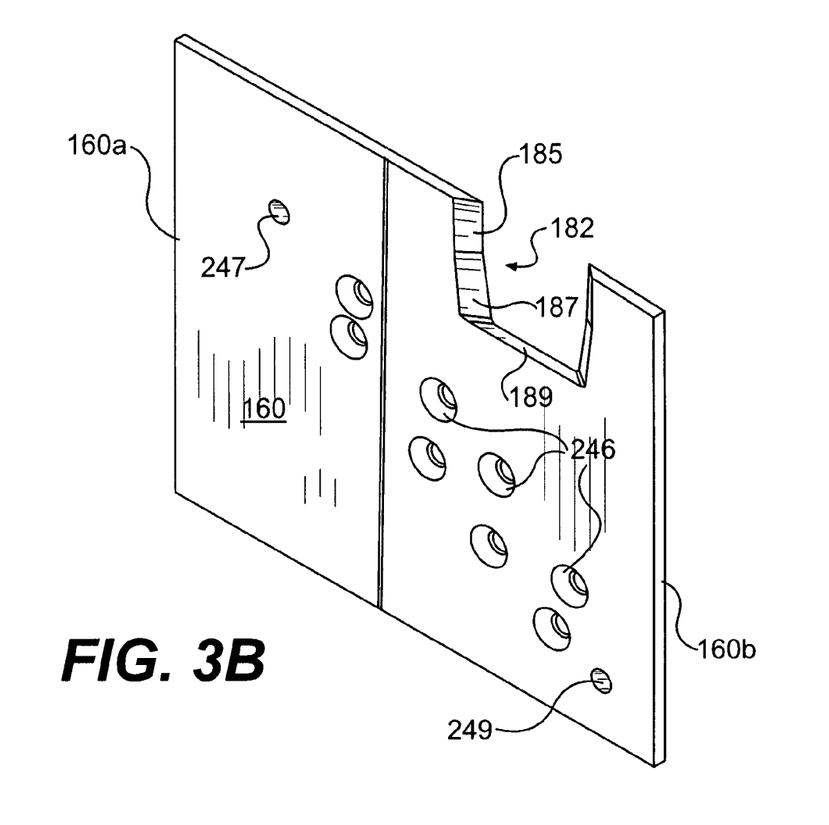
FIG. 3b is a perspective view of one mounting plate.

FIG. 3b shows a perspective view of one mounting plate 160. The other plates 162 and 164 will be the same so only one is being shown in detail. Plate 160 can be, for example, a flat, metal plate having opposing ends 160a and 160b. A generally, U-shaped cut 182 is provided along one side edge to accommodate a shaft coupling 180 having a cylindrical body portion 183 with a diameter larger than the inner dimension of triangular opening 168. This U-shaped cut out 180 can have straight sides and a flat bottom or, alternatively shown in FIG. 3b, could include an upper angled or beveled portion 185, a lower portion in the form of narrowing and angled or beveled sides 187 and a bottom edge 189. In this way, the U-shaped cut 182 can more closely mirror and fit the shape of the cylindrical body portion 183 which, as shown in FIG. 2a, can include a substantially cylindrical upper portion 188 and a tapering or conical lower portion 190 that interfit with sides 185 and 187, respectively, of cut out 182. It should be understood, however, that this particular plate design, the form of cut out 182 and the design of the shaft coupling 180 are exemplary. Thus, the U-shaped cut 182 and the exterior of the shaft coupling 180 can have a variety of shapes and sizes. Indeed, the exterior of the shaft coupling 180 may be small enough to simply fit within the opening 168 without the need for any U-shaped cut out being provided or formed in the mounting plates, or each could be modified to fit together in a variety of ways or may employ a variety of designs and/or configurations that will interfit and provide a suitable support for shaft 110.

Mounting plate 160 is also shown with a plurality of mounting holes 246 and 247 that will receive mounting screws, bolts, studs or other locating or interconnection devices to position, mount and hold rotor blades in place within hub 152.

Figure 4A:
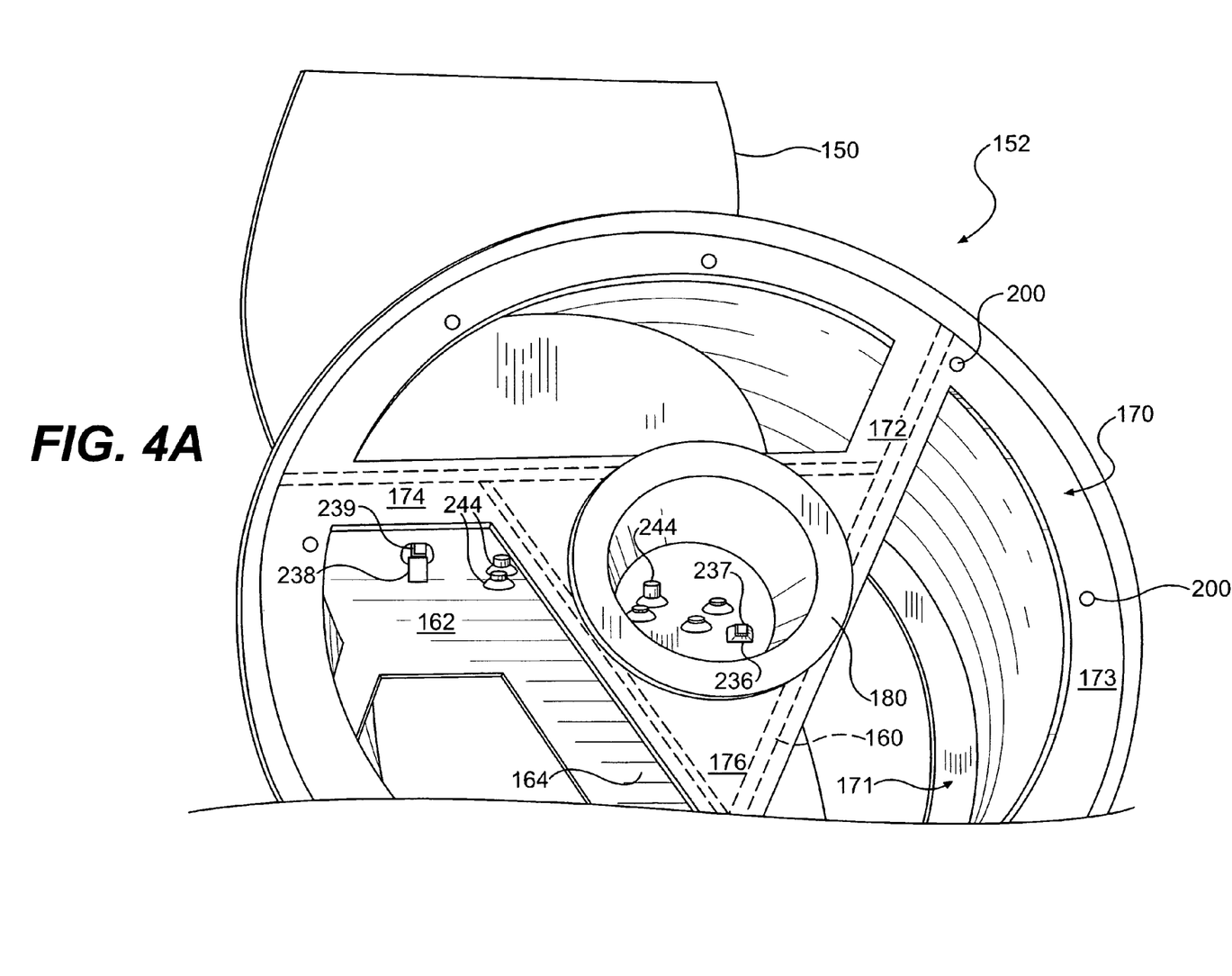
FIG. 4a is a perspective view of a completed hub with one rotor blade attached.
Figure 4B:
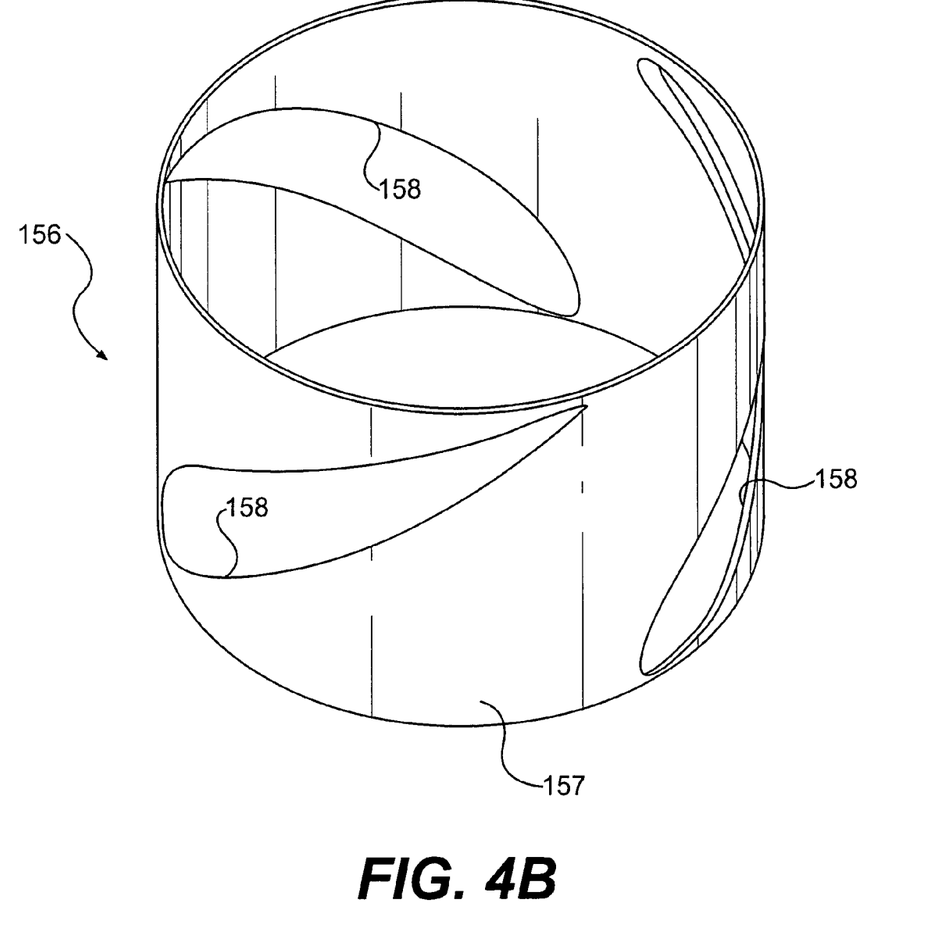
FIG. 4b is a perspective view of an outer fairing.
Figure 5:
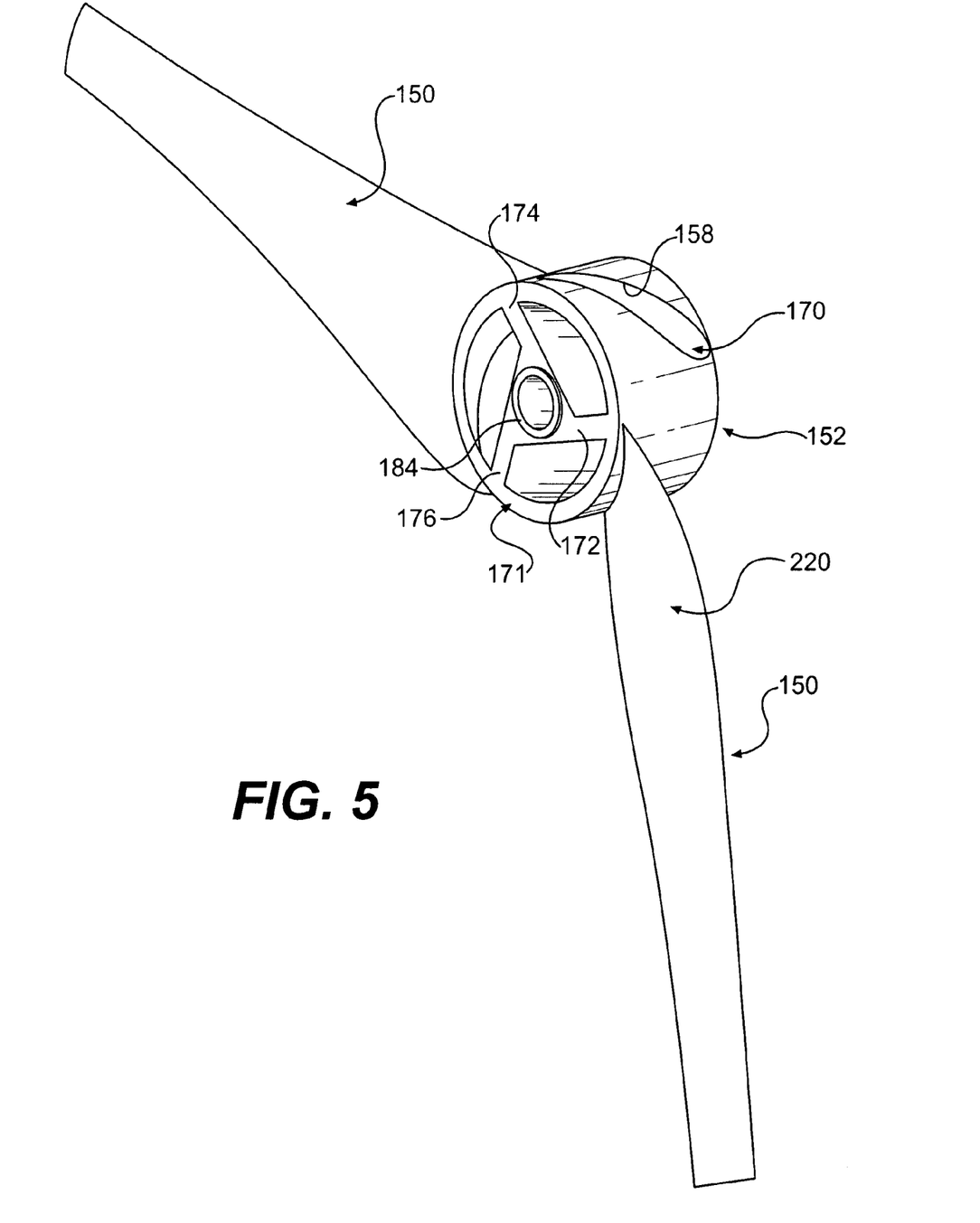
FIG. 5 is a representation of the rotor hub with one rotor blade attached, shown in full line, a second rotor blade that is shown with the internal skeleton in place and one open and unused rotor opening in the rotor hub.

Once the mounting plate core portion of hub 152 is assembled, a cylindrical fairing 156, shown in FIG. 4b, can be mounted over side plates 170 and 171 to form a completed hub as shown in FIGS. 4a and 5. The cylindrical outer fairing 156 that covers and forms the exterior of the rotor hub 152 provides a cosmetic and hydrodynamic exterior for rotor hub 152 prior to the mounting of rotor blades 150. Fairing 156 includes a cylindrical side wall 157 that is provided with three openings 158 that are uniformly spaced about the circumference thereof. Each opening 158 is shaped corresponding to, for example, a foil shape of the blade at the point where the root portion of the blade passes there through into the interior of hub 152. However, it should be understood that openings having other shapes could also be used, depending upon the particular rotor blade design being used, what is desired at the exterior of the fairing and perhaps depending upon the materials being used for the various components.

FIG. 4a shows a series of bolts 200 extending outwardly from the outer ring 173 of end plate 170 that are visible on that side of rotor hub 152. This side of rotor hub 152 can be connected to the tail cone 154 by bolts 200 while the other side will be free to rotate relative to the adjacent end of nacelle 104. The rotor hub 152 will be attached to a shaft 110 via the two, opposing shaft couplings 180 located on each side of rotor hub 152 along with suitable bearings (not shown). Shaft 110 will, in turn, then be rotatably mounted on and supported by nacelle 104. Shaft 110 will be rotatably mounted to nacelle in a conventional manner, which is well understood in the art, and further description thereof is not believed to be needed.

While this particular embodiment relates to a turbine structure having a down stream rotor, this same approach can be sued with an upstream mounted rotor.

FIG. 5 shows the next step in the fabrication of a fully completed rotor hub 152. One rotor blade 150 is shown as having been mounted to mounting plate 162. To best appreciate this mounting technique it is important to understand the construction of the rotor blades 150 and especially the root sections thereof.

Rotor blades 150 conventionally have varying foil dimensions that decrease over the blade's length from a larger dimension at the root end 224 to a smaller dimension toward the tip 226, although a rotor design could also have a root end that could exhibit a reduced dimension adjacent hub 152. Also, new rotor blade designs are disclosed within the Blade Tip application identified above, that employ tip structures that deviate from that conventional approach. However, while the preferred rotor blades 103 have a constant foil shape that will be uniform from the point rotor blade 150 intersects the hub 152 to the root end 224, other blade designs could also be employed and mounted in a similar manner.

Figure 6:
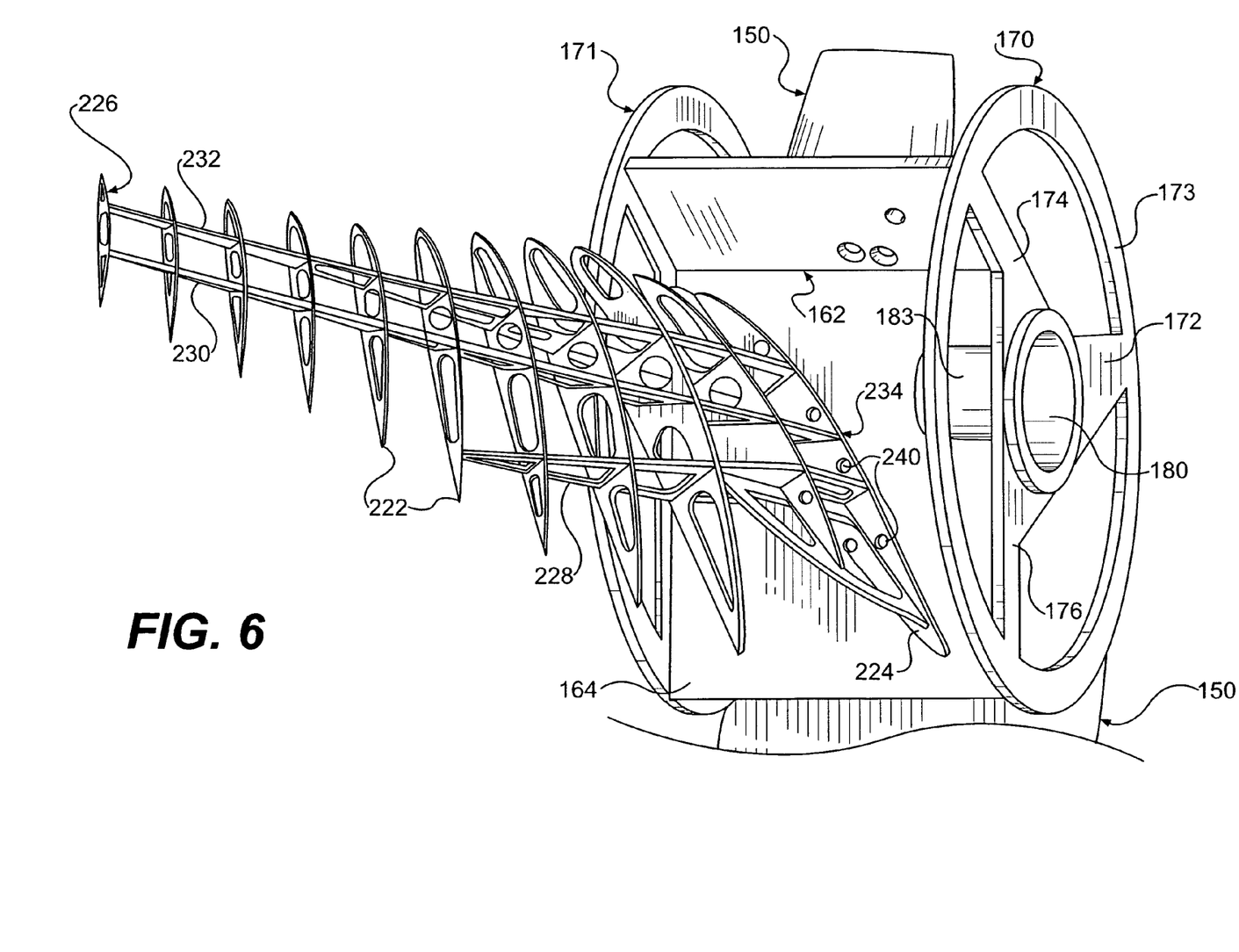
FIG. 6 shows a partial rotor hub, the rotor blade skeleton, including the root plate, attached to the mounting plate.
Figure 7:
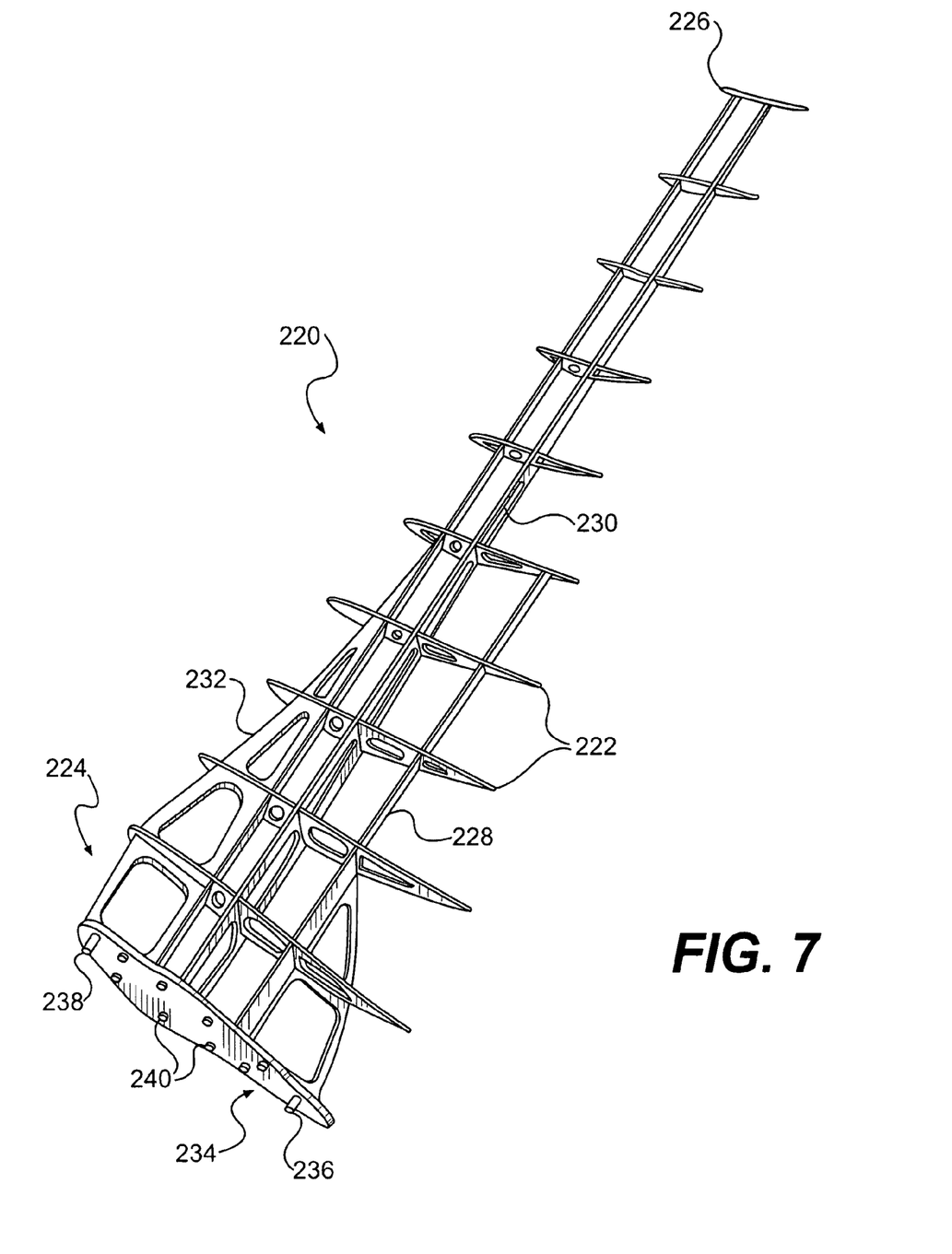
FIG. 7 is a perspective view of one embodiment of the rotor blade skeleton.
Figure 8:
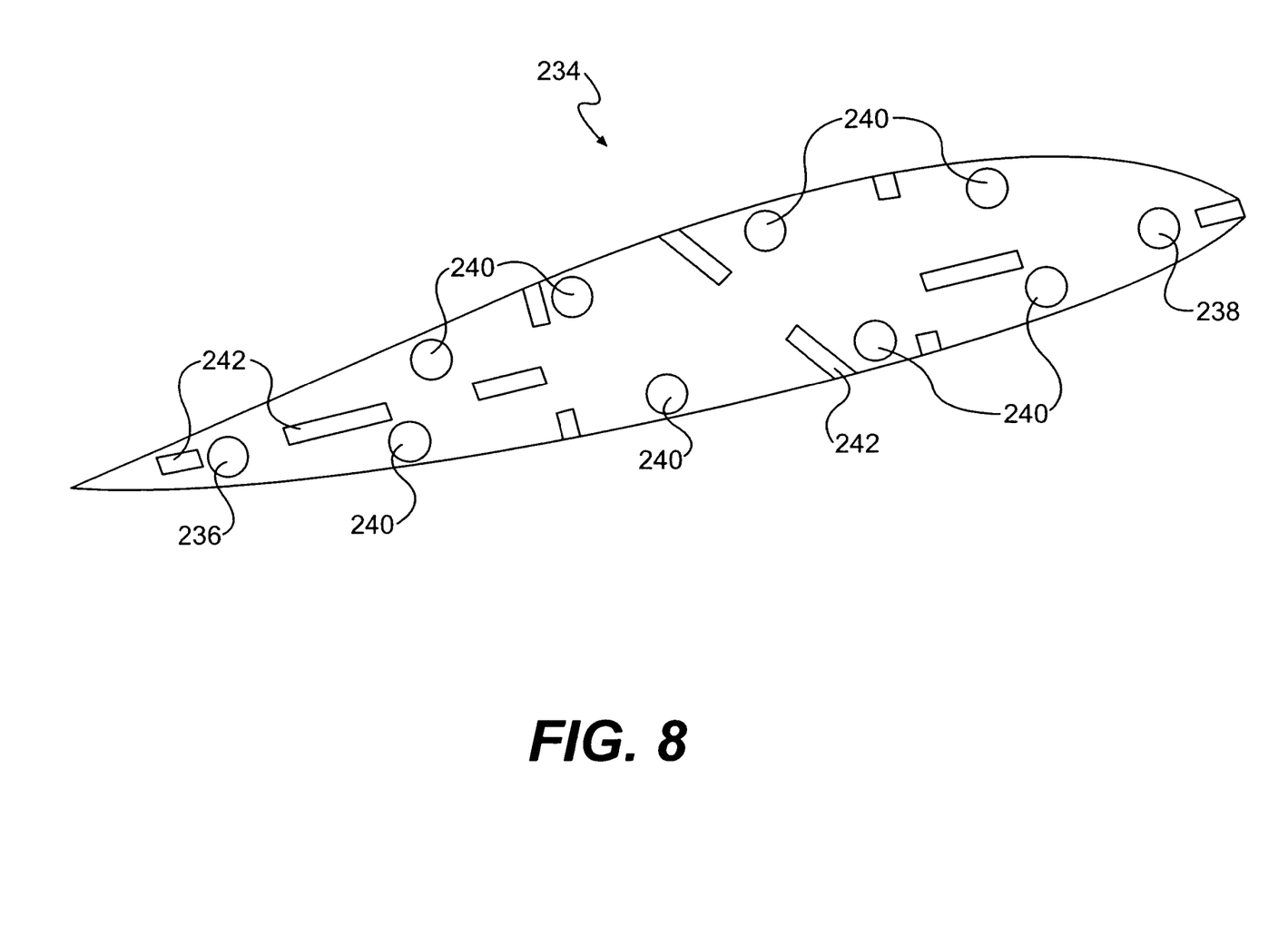
FIG. 8 is a more detailed plan view of one embodiment of a root plate.

There are a number of approaches for making rotor blades. Each rotor blade 150 can have, for example, an internal skeleton structure 220, as shown in FIGS. 5-7 with an outer skin or surface formed there over. FIG. 5 shows two blades 150 connected to rotor hub 152, with one being shown in a finished form while the other has been drawn to expose such an internal skeleton 220. This internal skeleton 220 is best shown in FIGS. 6 and 7 as being comprised of spaced apart foil shaped webs 222 that vary in size, shape and placement between the root end 224 and the tip 226 of the rotor blade 150 so as to provide the desired foil shape. Also included as part of this internal skeleton 220 are an exemplary series of lengthwise extending support members 228, 230 and 232. At the root end 224 there is an end or root plate 234, a plan view of which is shown in FIG. 8. Root plate 234 is preferably a shaped plate that has been designed to fit with the progression of the shaped webs within the skeleton 220 and to also match the shape and orientation of mounting plates 160-164. What is important is that the mounting plate structure, 160-164, within the rotor hub 152 and the root plates 234 be oriented in or at complementary angles, shapes and locations so that the two structures mate and can be removably connected together in an efficient and strong manner.

Threaded studs 236 and 238 are welded or otherwise fixed at opposing ends of root plate 234 and these will help orient and initially interfit the root end of a rotor with a pair of mounting holes, 247 and 249, respectively provided on each mounting plate 160-164, and as shown in FIG. 3b. Use of threaded studs 236 and 238 should be understood as being exemplary as in other designs screws, bolts, or other similar connection or mounting devices could be used as well.

Root plate 234 also includes a plurality of threaded holes 240 and a series of formed or machined openings 242 that will receive the root ends of the lengthwise extending support members 228, 230 and 232 that will be welded or otherwise secured therein.

FIG. 4a shows both of the threaded studs 236 and 238 protruding through mounting plate 162 and as being are secured in place by nuts 237 and 239, respectively. Also shown are a series of mounting screws 244 that are in the process of being screwed into threaded holes 240 in root plate 234 through a similar series of mating holes 246 provided within the mounting plates 160-164. Each of the mounting plates 160 and 164 will be similarly formed and additional rotor blades 150 will be secured to each of those mounting plates in the same manner. To facilitate the mounting process one or more openings could be provided at selected locations within the mounting plates 160-164 so that the placing and tightening of bolts, screws and/or nuts can proceed as easily as possible given the tightness of the area.

It should be understood as well that while conventional rotor blades taper from the root end toward the tip end, rotor blades 150 are designed to have a uniform or constant foil shape from the point where they enter hub 152 straight inward toward and through to the root end plate 234 at which point they connect to mounting plates 160-164. This, in effect, equals having extruded the curved rotor blade surface inwards form the point that the rotor blade intersected the theoretical hub cylinder defined by the exterior of hub 152.

While it is preferred that the mounting plates 160-164 and the root plates 234 both be flat, what is important is that the mating plates be shaped in a complimentary manner. Accordingly, both the mounting plates 160-164 and the root plates 234 could be curved, either in a convex or concave manner, or have other mating shapes and orientations to best fit together and accommodate what could be varying rotor blade designs including the twists or other configurations that might be associated therewith. In addition, while it is preferred to use metal for the rotor hub 152, it could be formed form other materials that were suitably strong to support and hold rotor blades 105. Such materials could include polycarbonates, and reinforced plastic or fiberglass.

In addition, rotor blades 150 could be formed by using other techniques including both cast and/or molded structures. In such cases, the root end of such rotors could be formed with bolts or threaded studs cast or formed in place or alternatively, and preferably, the root ends could be formed flat and then provided with drilled or formed wells in which insert sleeves could be screwed or glued in place to receive screws 244 or threaded studs that would then be secured by nuts as described above. There are many approaches at forming both rotors and the root ends thereof and each is meant to be included within this description and invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A mounting arrangement for holding a plurality of turbine rotor blades comprising a hub having a plurality of equally spaced openings extending thereabout for removably receiving a root end of a one of a plurality of rotor blades, the root end of each rotor blade including a root mount formed thereon, a mounting assembly secured internally within the hub and including a like plurality of interconnected mounting plates as there are rotor blades, the plurality of mounting plates being uniformly positioned about the hub to cooperate with the plurality of equally spaced openings, an exterior frame mounted to opposing sides of the plurality of mounting plates with each of the plurality of the mounting plates having an outer end that terminates at a cylindrical sidewall, and a fastening mechanism for removably connecting each root mount to one of the plurality of mounting plates within the mounting assembly.

2. The mounting arrangement as in claim 1 wherein the mounting assembly further includes a shaped interior defined by interconnecting portions of the plurality of mounting plates and a shaft coupling mounted within the shaped interior.

3. The mounting arrangement as in claim 1 wherein the mounting assembly further includes a flat mounting plate for each of the plurality of rotor blades.

4. The mounting arrangement as in claim 1 wherein the mounting assembly includes three mounting plates that intersect and are fixed to one another within the hub.

5. The mounting arrangement as in claim 4 wherein the root mount comprises a root plate.

6. The mounting arrangement as in claim 5 wherein mating surfaces of the mounting plate and root plate are flat.

7. The mounting arrangement as in claim 5 wherein the mating surfaces of the root plate and the mounting plate are complimentary shaped to fit together.

8. The mounting arrangement as in claim 4, wherein the exterior frame comprises an end plate comprised of a plurality of interconnecting webs.

9. The mounting arrangement as in claim 8 further including a shaft coupling mounted centrally of the hub.

10. The mounting arrangement as in claim 4 wherein the mounting plates extend across substantially equal chords of the rotor hub.

11. The mounting arrangement as in claim 1 wherein the root of the rotor blade has a uniform foil shape between a hub intersection point and the mounting assembly.

12. A mounting arrangement for holding a plurality of turbine rotor blades comprising a hub having a plurality of equally spaced openings extending thereabout for removably receiving a root end of a rotor blade, a mounting assembly secured internally within the hub, the root end having a root mount formed thereon, and a fastening mechanism for removably connecting the root mount to the mounting assembly, wherein the mounting assembly includes three mounting plates that intersect and are fixed to one another within the hub.

13. The mounting arrangement in claim 12 wherein the three mounting plates are flat plates.

14. A mounting arrangement for holding a plurality of turbine rotor blades comprising:
    a hub having a plurality of equally spaced openings extending thereabout for removably receiving a root end of a rotor blade that includes a root mount formed thereon,
    a mounting assembly secured internally within the hub, the mounting assembly including a plurality members each having an inner end and an outer end, and arranged so that the inner end of each member contacts another member at a point between the inner and outer ends and form a shaped interior recess therewithin; and
    a fastening mechanism for removably connecting the root mount to the mounting assembly.

15. The mounting arrangement in claim 14 wherein the plurality of members each comprise a flat plate.

16. The mounting arrangement in claim 14 wherein the plurality of members comprise mounting plates that extend across substantially equal chords of the rotor hub.

\* \* \* \* \*